(12) United States Patent
Xia et al.

(10) Patent No.: US 9,282,570 B2
(45) Date of Patent: Mar. 8, 2016

(54) METHOD AND APPARATUS FOR TRANSMITTING UPLINK CONTROL SIGNALING ON PHYSICAL UPLINK SHARED CHANNEL

(75) Inventors: Shuqiang Xia, Shenzhen (CN); Weiwei Yang, Shenzhen (CN); Chunli Liang, Shenzhen (CN); Bo Dai, Shenzhen (CN); Jun Xu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 470 days.

(21) Appl. No.: 13/391,350

(22) PCT Filed: Jun. 25, 2010

(86) PCT No.: PCT/CN2010/074551
§ 371 (c)(1),
(2), (4) Date: Feb. 20, 2012

(87) PCT Pub. No.: WO2010/145588
PCT Pub. Date: Dec. 23, 2010

(65) Prior Publication Data
US 2012/0201212 A1    Aug. 9, 2012

(30) Foreign Application Priority Data

Oct. 27, 2009  (CN) .......................... 2009 1 0207139

(51) Int. Cl.
*H04W 72/04*    (2009.01)
*H04W 72/12*    (2009.01)
(Continued)

(52) U.S. Cl.
CPC ......... *H04W 72/1268* (2013.01); *H04L 1/0027* (2013.01); *H04L 1/0028* (2013.01); *H04W 88/04* (2013.01); *H04L 1/0003* (2013.01); *H04L 1/0009* (2013.01); *H04W 72/1284* (2013.01)

(58) Field of Classification Search
USPC ......... 370/329, 252, 318, 322, 330, 332, 349; 455/450, 456.1, 522
See application file for complete search history.

(56) References Cited

U.S. PATENT DOCUMENTS

| | | | | |
|---|---|---|---|---|
| 7,392,460 | B2* | 6/2008 | Kim et al. | ...................... 714/781 |
| 2007/0208986 | A1* | 9/2007 | Luo | ..................... H03M 13/136 714/752 |

(Continued)

FOREIGN PATENT DOCUMENTS

| | | |
|---|---|---|
| EP | 2086153 A2 | 5/2009 |
| WO | 2008112314 A1 | 9/2008 |

OTHER PUBLICATIONS

"Technical Specification Group Radio Access Network", Further Advancements for E-UTRA, 3rd Generation Partnership Project; Physical Layer Aspects, (Release 9), 3GPP TR 36.814 V14.0(Sep. 2009; See the whole document.

(Continued)

*Primary Examiner* — Phuongchau Ba Nguyen
(74) *Attorney, Agent, or Firm* — Ling Wu; Stephen Yang; Ling and Yang Intellectual Property (57) ABSTRACT

The present invention discloses a method for transmitting uplink control signaling in a Physical Uplink Shared Channel (PUSCH). The method includes: when two transport blocks/codewords are transmitted in the PUSCH, mapping uplink control signaling to the layer corresponding to one of the two transport blocks/codewords to transmit. The present invention also discloses an apparatus for transmitting uplink control signaling in the PUSCH. The apparatus includes: a mapping unit, used for mapping uplink control signaling to the layer corresponding to one of two transport blocks/codewords when the two transport blocks/codewords are transmitted in the PUSCH; and a transmission unit, used for transmitting the uplink control signaling. The present invention effectively solves the problem of transmitting uplink control signaling in the PUSCH when the PUSCH uses spatial multiplexing in an LTE-A system.

7 Claims, 3 Drawing Sheets

(51) Int. Cl.
H04W 88/04 (2009.01)
H04L 1/00 (2006.01)

(56) References Cited

U.S. PATENT DOCUMENTS

| | | | |
|---|---|---|---|
| 2008/0186934 | A1 | 8/2008 | Khan et al. |
| 2009/0262695 | A1* | 10/2009 | Chen et al. .................... 370/329 |
| 2009/0262856 | A1* | 10/2009 | Onggosanusi ....... H04B 7/0413 375/267 |
| 2009/0313516 | A1* | 12/2009 | Shin et al. .................... 714/748 |
| 2010/0142455 | A1* | 6/2010 | Imamura ............ H04W 52/146 370/329 |
| 2010/0195624 | A1* | 8/2010 | Zhang et al. .................. 370/335 |
| 2010/0303016 | A1* | 12/2010 | Jin ...................... H04L 27/0008 370/328 |
| 2011/0051824 | A1* | 3/2011 | Kim ......................... H04B 7/04 375/259 |
| 2011/0274043 | A1* | 11/2011 | Nam ....................... H04L 5/001 370/328 |
| 2011/0310780 | A1* | 12/2011 | Xiao .................... H04L 1/0028 370/310 |
| 2011/0310853 | A1* | 12/2011 | Yin ...................... H04L 1/0009 370/335 |
| 2012/0201212 | A1* | 8/2012 | Xia et al. ...................... 370/329 |
| 2012/0243511 | A1* | 9/2012 | Lv ......................... H04L 1/0031 370/335 |
| 2012/0320852 | A1* | 12/2012 | Seo et al. ...................... 370/329 |

OTHER PUBLICATIONS

Huawei: "Multiplexing of control and data in multi-layer PUSCH transmission", 3GPP TSG RAN WG1 Meeting #59bis R1-100261, Jan. 22, 2010.

ETRI: "UCI multiplexing with data on PUSCH", 3GPP TSG RAN WG1 Meeting #59bis R1-100465, Jan. 22, 2010.

Samsung: "Discussion on data and control multiplexing in UL MIMO transmissions", 3GPP TSG RAN WG1 #60 R1-101186, Feb. 2, 2010.

LG Electronics: "Multiplexing scheme with UCI and data on PUSCH", 3GPP TSG RAN WG1 #60bis R1-102387, Apr. 16, 2010.

ZTE: "UCI multiplexing on PUSCH with MIMO transmission", 3GPP TSG RAN WG1 Meeting #60bis R1-101818,Apr. 16, 2010.

3GPP TR 36.814 v0.4.1, Further Advancements for E-UTRA Physical Layer Aspects, 3GPP, Feb. 2009.

3GPP TS 36.213 v8.8.0, Evolved Universal Terrestrial Radio Access(E-UTRA); Physical layer procedures, 3GPP, Sep. 2009.

International Search Report for PCT/CN2010/074551 dated Jul. 23, 2010.

3GPP TS 36.211 V8.8.0: Evolved Universal Terrestrial Radio Access (E-UTRA); Physical Channels and Modulation (Release 8) Sep. 1, 2009.

3GPP TS 36.212 V8.7.0: Evolved Universal Terrestrial Radio Access (E-UTRA); Multiplexing and Channel coding (Release 8) May 1, 2009.

R1-093054, 3GPP TSG RAN WG1 Meeting #58, Aug. 24-Aug. 28, 2009, Shenzhen (China), see the whole document.

R1-102910, 3GPP TSG-RAN WG1 Meeting #61, May 10-May 14, 2010, Montreal (Canada), see pp. 1-5.

R1-103601, 3GPP TSG-RAN WG1 Meeting #61bis, Jun. 28-Jul. 2, 2010, Dresden (Germany), see pp. 1-4.

R1-104678, 3GPP TSG RAN WG1 Meeting #62, Aug. 23-Aug. 27, 2010, Madrid (Spain), see pp. 1-5.

R1-105459, 3GPP TSG RAN WG1 Meeting #62bis, Oct. 11-Oct. 15, 2010, Xi'an (China), see pp. 1-6.

R1-106409, 3GPP TSG RAN WG1 Meeting #63, Nov. 15-Nov. 19, 2010, Jacksonville (USA) see pp. 1-9.

3 GPP TR 36.814, V1.4.2 (Sep. 2009); 3rd Generation Partnership Project; Technical Specification Group Radio Access Network; Further Advancements for E-UTRA Physical Layer Aspects (Release 9); See pp. 1-50.

* cited by examiner

METHOD AND APPARATUS FOR TRANSMITTING UPLINK CONTROL SIGNALING ON PHYSICAL UPLINK SHARED CHANNEL

TECHNICAL FIELD

The present invention relates to uplink control signaling transmission technology, and more especially, to a method and an apparatus for transmitting uplink control signaling in physical uplink shared channel (PUSCH).

BACKGROUND OF THE RELATED ART

In the long term evolution (LTE) system, the control signaling that needs to be transmitted in the uplink are Acknowledgement/Negative Acknowledgement (ACK/NACK) information, as well as three forms of Channel State Information (CSI) reflecting the downlink physical state: Channel Quality Indication (CQI), Pre-coding Matrix Indicator (PMI), and Rank Indicator (RI).

In the LTE system, the ACK/NACK information is transmitted in the Physical Uplink Control Channel (PUCCH) with the format 1/1a/1b (PUCCH format 1/1a/1b), if the User Equipment (UE) needs to send uplink data information, the uplink data is transmitted in the Physical Uplink Shared Channel (PUSCH), the feedback of the CQI/PMI and RI might be periodic feedback or aperiodic feedback, and the specific feedback is shown as Table 1:

TABLE 1

| Scheduling mode | Periodic CQI report channels | Aperiodic CQI report channels |
| --- | --- | --- |
| Frequency non-selective | PUCCH | |
| Frequency selective | PUCCH | PUSCH |

For the periodic CQI/PMI and RI, if the UE does not need to transmit the uplink data information, the CQI/PMI and RI are transmitted in the PUCCH with the PUCCH format 2/2a/2b, if the UE needs to transmit uplink data information, the CQI/PMI and RI are transmitted in the PUSCH; for the aperiodic CQI/PMI and RI, they are only transmitted in the PUSCH.

Figure 1:
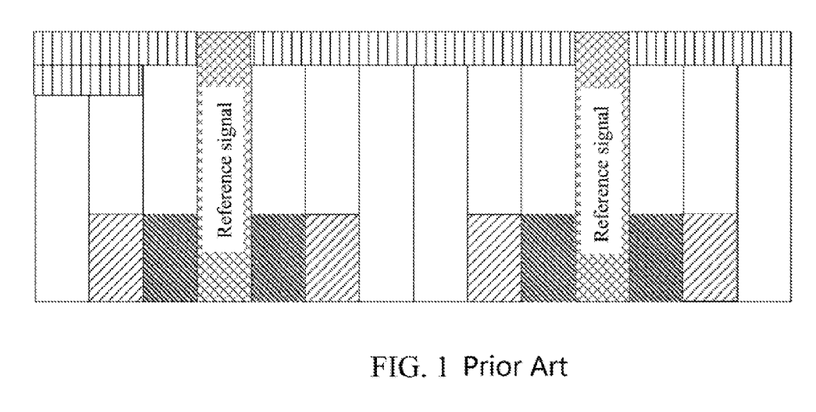
FIG. 1 is a diagram of a way for multiplexing uplink control signaling and uplink data in the LTE system.
Figure 2:
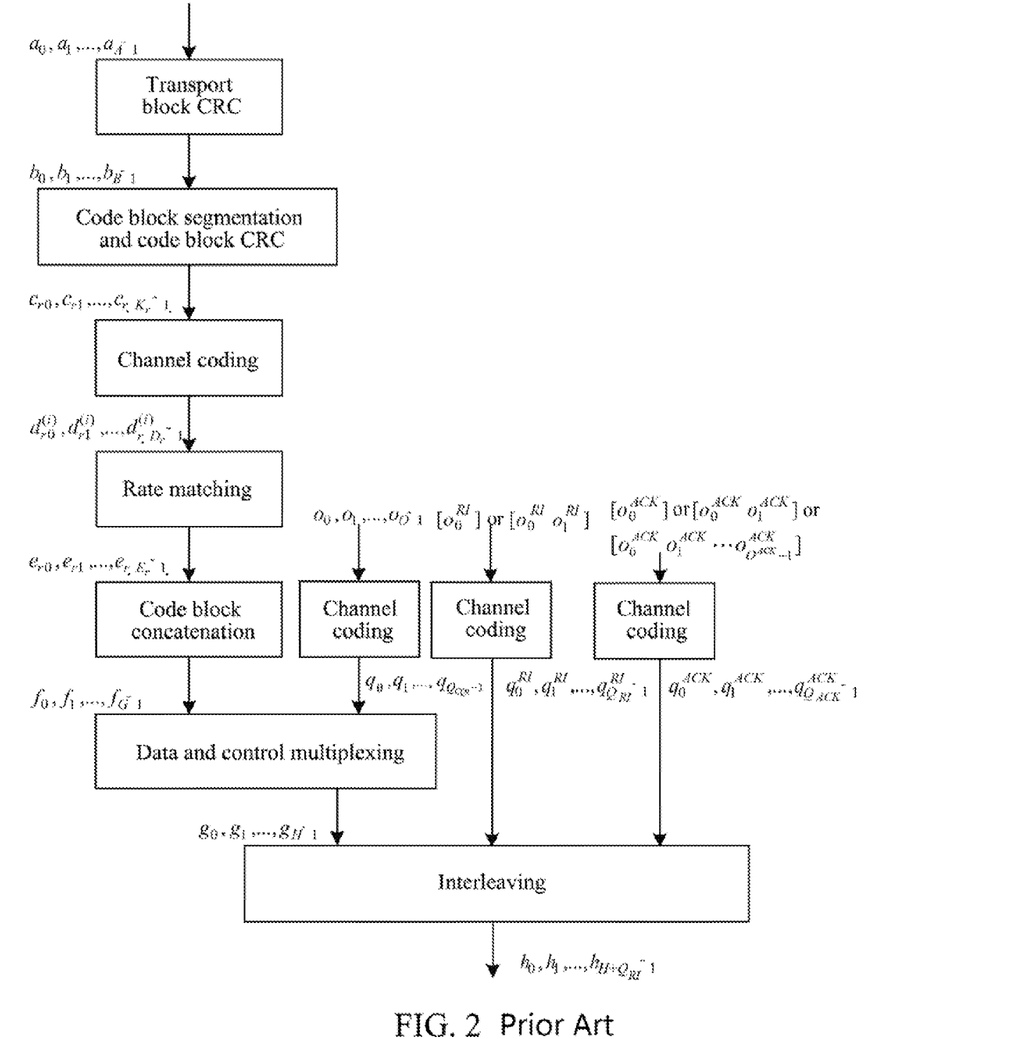
FIG. 2 is a diagram of a channel coding process when multiplexing the uplink control signaling system and the uplink data in the LTE system.
Figure 3:
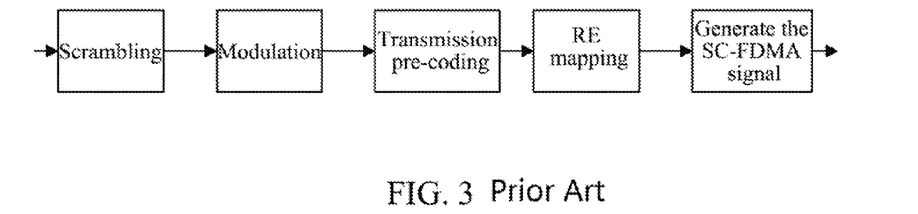
FIG. 3 is a diagram of PUSCH transmission in the LTE system.
Figure 4:
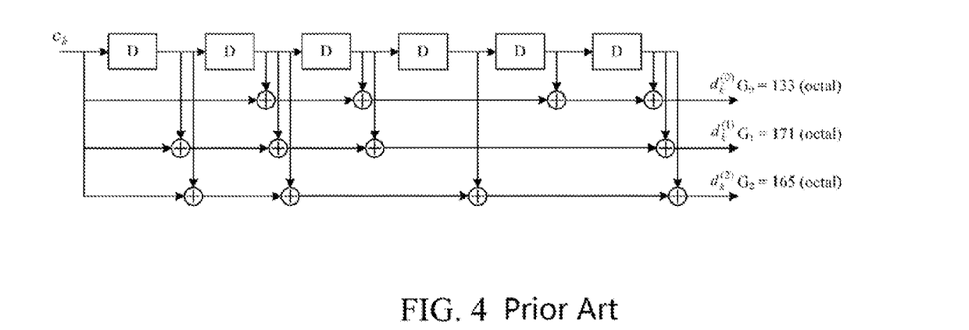
FIG. 4 is a diagram of the tail biting convolution encoding with the codeword length of 7 bits and the rate of ⅓.

FIG. 1 is a diagram of a method for multiplexing uplink control signaling and uplink data in the LTE system, as shown in FIG. 1, the area covered by the vertical lines carries the CQI/PMI information, the area covered with the oblique lines carries the RI information, and the shaded area carries the ACK/NACK information, and the blank area carries the uplink data information. FIG. 2 is a diagram of the channel coding process when multiplexing the uplink control signaling and the uplink data information in the LTE system, as shown in FIG. 2, the uplink data information in the LTE system is transmitted in the form of Transport Blocks (TBs), after the TBs are processed with the CRC attachment, Code block segmentation and Code block CRC attachment, Channel coding, Rate matching, Code block concatenation and coding, the multiplexing of the uplink data and the control signaling is performed on the CQI/PMI, and finally via the channel interleaving, the encoded ACK/NACK information, the RI signaling and the data information are multiplexed together. FIG. 3 is a diagram of a PUSCH transmission way in the LTE system, as shown in FIG. 3, it can be seen that the PUSCH is transmitted in the form of a single antenna, thus the PUSCH only corresponds to one TB which forms a codeword after the channel coding, that is, the PUSCH only has one codeword in the LTE system. The process of encoding the uplink control signaling is: first calculating the target length, and then performing channel coding, the ways for encoding the ACK/NACK information and RI information are the same, if the ACK/NACK information or the RI information is of 1 bit, in the case of the QPSK modulation, the encoded information is $[o_0, y]$; in the case of the 16 QAM modulation, the encoded information is $[o_0, y, x, x]$; in the case of the 64 QAM modulation, the encoded information is $[o_0, y, x, x, x, x]$; where, $o_0$ denotes the ACK/NACK information or the RI information, x and y denote the placeholders maximizing the Euclidean distance of the modulation symbol during the scrambling; if the ACK/NACK information or the RI information is of 2 bits, in the case of the QPSK modulation, the encoded information is $[o_0, o_1, o_2, o_0, o_1, o_2]$; in the case of the 16 QAM modulation, the encoded information is $[o_0, o_1, x, x, o_2, o_0, x, x, o_1, o_2, x, x]$; in the case of the 64 QAM modulation, the encoded information is $[o_0, o_1, x, x, x, x, o_2, o_0, x, x, x, x, o_1, o_2, x, x, x, x]$; where, $o_0$ and $o_1$ denote the 2-bit ACK/NACK information or the RI information, $o_2 = (o_0 \oplus o_1)$, where $\oplus$ denotes XOR operation; x denotes the placeholder maximizing the Euclidean distance of the modulation symbol during the scrambling; since there is a case in the LTE system that the number of ACK/NACK information is of more than 2 bits, such as in the TDD system, therefore, when the number of ACK/NACK information is of more than 2 bits, a linear block code can be used to encode, for example, the RM (32, O) is used to encode, where O denotes the number of data bits before the encoding, and 32 denotes the number of data bits after the encoding. When the number of bits of the CQI/PMI is less than or equals to 11 bits, the CQI uses the RM(32, 0) to encode; otherwise, the CRC attachment is firstly performed, and then uses tail biting convolution coding with the codeword length being 7 and the rate being ⅓ as shown in FIG. 4 is used to encode, and finally the bits after encoding the ACK/NACK, the RI, and the CQI/PMI is repeated until the target length is met, the encoded information bits are denoted as $[q_0^{ACK}, q_1^{ACK}, q_2^{ACK}, \ldots, q_{Q_{ACK}-1}^{ACK}]$, $[q_0^{CQI}, q_1^{CQI}, q_2^{CQI}, \ldots, q_{Q_{CQI}-1}^{CQI}]$ and $[q_0^{RI}, q_1^{RI}, q_2^{RI}, \ldots, q_{Q_{RI}-1}^{RI}]$. Multiplexing the uplink data and the control signaling is cascading the encoded CQI/PMI information and data in the form of modulation symbol, denoted as $[g_0^i, g_1^i, g_2^i, \ldots, g_{H^*_i-1}^i]$. The channel interleaving process is to write the encoded ACK/NACK message bits $[q_0^{ACK}, q_1^{ACK}, q_2^{ACK}, \ldots, q_{Q_{ACK}-1}^{ACK}]$, the RI information bits $[q_0^{RI}, q_1^{RI}, q_2^{RI}, \ldots, q_{Q_{RI}-1}^{RI}]$, as well as the data and control multiplexed $[g_0^i, g_1^i, g_2^i, \ldots, g_{H^*_i-1}^i]$ into a virtual matrix according to a certain order, and then read out the virtual matrix according to the order of from row to column, thus to ensure that in the subsequent process of mapping the modulation symbols to the physical resources, the ACK/NACK, RI, CQI/PMI and data can be respectively mapped to the positions shown in FIG. 1, and the specific process of channel interleaving is described as follows:

(1) first generate a virtual matrix, wherein the size of the virtual matrix is related to the PUSCH resource allocation;

(2) in accordance with the order of first writing into the columns and then into the rows of the virtual matrix, write from the last column to the first column of the virtual matrix, write the encoded RI information bits $[q_0^{RI}, q_1^{RI}, q_2^{RI}, \ldots, q_{Q_{RI}-1}^{RI}]$ with the form of modulation symbols into the predetermined positions of the RI information in the virtual matrix;

(3) start from the position of the first row and first column of the virtual matrix, according to the order of from column to row, write $[g_0^i, g_1^i, g_2^i, \ldots, g_{H^*_i-1}^i]$ into the virtual matrix, and when writing, skip the positions into which the RI information has been written;

(4) in accordance with the order of first writing into the columns and then into the rows of the virtual matrix, start to write from the last row to the first row of the virtual matrix, write the encoded ACK/NACK information bits $[q_0^{ACK}, q_1^{ACK}, q_2^{ACK}, \ldots, q_{Q_{ACK}-1}^{ACK}]$ into the predetermined positions of the ACK/NACK information in the virtual matrix with the form of modulation symbols, when writing, if a position has been written in, then the data symbol at the position is deleted.

(5) Finally, read out the virtual matrix according to the order of from row to column, and obtain the interleaved sequence with the form of modulation symbols.

The predetermined positions of the RI information and the ACK/NACK response message are shown as Table 2 and Table 3:

TABLE 2

| cyclic prefix configuration | Column Set |
| --- | --- |
| Normal | {1, 4, 7, 10} |
| Extended | {0, 3, 5, 8} |

TABLE 3

| cyclic prefix configuration | Column Set |
| --- | --- |
| Normal | {2, 3, 8, 9} |
| Extended | {1, 2, 6, 7} |

In the LTE system, the eNB sends the modulation and coding scheme index $I_{MCS}$ to the UE via the PDCCH, and the eNB specifies the modulation and coding scheme index $I_{MCS}$, the PUSCH modulation scheme, the transport block size, the redundant version, and other related information as well as their relationships, as shown in Table 4:

TABLE 4

| Modulation and coding scheme index $I_{MCS}$ | Modulation order $Q_m$ | Index of transport block size $I_{TBS}$ | Redundant version $rv_{idx}$ |
| --- | --- | --- | --- |
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

The LTE system also specifies that the code rate is acquired according to the TB size and the resource block size and according to the relationship between the TB index and the TB size.

The Long Term Evolution Advanced (LTE-A) system, as the evolution standard of the LTE system, supports greater uplink transmission rate, thus the PUSCH transmission supports spatial multiplexing. For the PUSCH which uses the spatial multiplexing to transmit, the relevant technique gives the relationship of mapping the codewords to the layers, and that relationship is the same as the relationship of mapping the codewords to the layers in the downlink transmission in the LTE system, and the specific mapping process is shown as Table 5:

TABLE 5

| The number of layers | The number of codewords | The mapping the codewords to the layers $i = 0, 1, \ldots, M_{symb}^{layer} - 1$ | |
| --- | --- | --- | --- |
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$ $x^{(1)}(i) = d^{(0)}(2i+1)$ | $M_{symb}^{layer} = M_{symb}^{(0)}/2$ |
| 3 | 2 | $x^{(0)}(i) = d^{(0)}(i)$ $x^{(1)}(i) = d^{(1)}(2i)$ $x^{(2)}(i) = d^{(1)}(2i+1)$ | $M_{symb}^{layer} = M_{symb}^{(0)} = M_{symb}^{(1)}/2$ |
| 4 | 2 | $x^{(0)}(i) = d^{(0)}(2i)$ $x^{(1)}(i) = d^{(0)}(2i+1)$ $x^{(2)}(i) = d^{(1)}(2i)$ $x^{(3)}(i) = d^{(1)}(2i+1)$ | $M_{symb}^{layer} = M_{symb}^{(0)}/2 = M_{symb}^{(1)}/2$ |

Where $M_{symb}^{layer}$ indicates the data amount transmitted on each layer, $M_{symb}^{(0)}$ and $M_{symb}^{(1)}$ respectively denote the number of symbols in each codeword, $d^{(0)}(i)$ and $d^{(1)}(i)$ respectively denote the data in each codeword, $x^{(0)}(i), \ldots, x^{(3)}(i)$ respectively denote data transmitted on each layer.

In the LTE-A system, there is a case that there are two codewords transmitted in the PUSCH, then the corresponding PDCCH control signaling includes the modulation and coding scheme indexes, respectively denoted as $I_{MCS}^{1}$ and $I_{MCS}^{2}$, of these two codewords.

In the LTE-A system, for the case that the PUSCH transmission supports the spatial multiplexing, there is no solution scheme for transmitting the uplink control signaling in the PUSCH when the PUSCH uses the special multiplexing in the related art.

SUMMARY OF THE INVENTION

In view of this, the main purpose of the present invention is to provide a method and an apparatus for transmitting uplink control signaling in a physical uplink shared channel (PUSCH) to achieve uplink control signaling transmission when two transport blocks/codewords are transmitted in the PUSCH.

To achieve the aforementioned purpose, the technical scheme of the present invention is implemented as:

a method for transmitting uplink control signaling in the physical uplink shared channel, comprising:

when two transport blocks/codewords are transmitted in the physical uplink shared channel (PUSCH), mapping the uplink control signaling to the layer corresponding to one of the two transport blocks/codewords to transmit.

Preferably, the transport block/codeword carrying the uplink control signaling is a fixed-numbered transport block/codeword Preferably, the transport block/codeword carrying the uplink control signaling is a transport block/codeword indicated by the signaling.

Preferably, the method also comprises:

Determining the indexes of the transport blocks/codewords in the PUSCH according to the modulation and coding scheme selected by the base station, wherein the base station notifies the user equipments of modulation and coding scheme indexes corresponding to the transport blocks/codeword.

Preferably, the transport block/codeword carrying the uplink control signaling is the transport block/codeword with a relatively large modulation and coding scheme index.

Preferably, the method also comprises:

when the transport block/codeword is a retransmitted transport block/codeword, taking the modulation and coding scheme index when the transport block/codeword is initially transmitted as the modulation and coding scheme index of the retransmitted transport block/codeword.

Preferably, the transport block/codeword carrying the uplink control signaling is such a transport block/codeword meets that the ratio of a size of the transport block/codeword to a size of a resource block occupied by the transport block/codeword is relatively large.

Preferably, the size of the resource block occupied by the transport block/codeword is a size of a physical resource block occupied by the PUSCH carrying the uplink control signaling.

An apparatus for transmitting uplink control signaling in a physical uplink shared channel, and the apparatus comprises a mapping unit and a transmission unit; wherein, the mapping unit is used to map the uplink control signaling to the layer corresponding to one of the transport blocks/codewords when there are two transport blocks are transmitted in the physical uplink shared channel (PUSCH);

the transmission unit is used to transmit the uplink control signaling.

Preferably, the apparatus further comprises: a set unit, used to set a transport block/codeword mapping the uplink control signaling to be a fixed-numbered transport block/codeword; or used to set a transport block/codeword mapping the uplink control signaling to be a transport block/codeword indicated by the signaling.

Preferably, the apparatus further comprises a determination unit; wherein, the determination unit is used to determine modulation and coding scheme indexes of the transport blocks/codewords on the PUSCH according to a selected modulation and coding scheme selected by a base station.

Preferably, the apparatus further comprises: a set unit used to set a transport block/codeword mapping the uplink control signaling to be a transport block/codeword with a relatively large modulation and coding scheme index.

Preferably, when the transport block/codeword is a retransmitted transport block/codeword, the modulation and coding scheme index when the transport block/codeword is transmitted for the first time is taken as a modulation and coding scheme index of the retransmitted transport block/codeword.

Preferably, the transport block/codeword carrying the uplink control signaling is such a transport block/codeword that the ratio of a size of a transport block/codeword to a size of a resource block size occupied by the transport block/codeword is relatively large.

Preferably, the size of the resource block size occupied by the transport block/codeword is a size of physical resource block occupied by the PUSCH carrying the uplink control signaling.

In the present invention, when there are two transport blocks/codewords in the PUSCH, only one of them is selected to carry the uplink control signaling, the UE determines the encoding scheme of the uplink control signaling according to the modulation and coding scheme index of the selected transport block/codeword, and transmits the uplink control signaling after the encoding. The present invention solves the problem of carrying the uplink control signaling when two transport blocks/codewords are transmitted in the PUSCH, thus to ensure that the uplink control signaling can be sent to the base station. The present invention effectively solves the problem of transmitting the uplink control signaling in the PUSCH when the PUSCH uses the spatial multiplexing in the LTE-A system, thus to ensure the data capacity, since the channel quality corresponding to the transport block selected in various ways is relatively good, the transmission quality of the uplink control signaling can be guaranteed.

PREFERRED EMBODIMENTS OF THE PRESENT INVENTION

The basic idea of the present invention is: when there are two transport blocks/codewords in the PUSCH, only one of them is selected to carry the uplink control signaling. The present invention solves the problem of carrying the uplink control signaling when there are two transport blocks/codewords in the PUSCH, to ensure that the uplink control signaling can be sent to the base station.

To make the purposes, technical solutions and advantages of the present invention more clear, the present invention would be illustrated in further detail with specific embodiments and the accompanying drawings.

The First Embodiment

Supposing there are two transport blocks TB1 and TB2 in the PUSCH, the base station always numbers the transport block with better channel conditions as TB1, the user equipment always determines to transmit the uplink control signaling on the TB1, acquires the corresponding modulation scheme $Q_m^1$ according to $I_{MCS}^1$, and the control signaling that need to be transmitted on the current sub-frame are respectively $[O_0^{ACK}, O_1^{ACK}, \ldots O_3^{ACK}]$, $[O_0^{RI}, O_1^{RI}]$, and $[O_0^{CQI}, O_1^{CQI}, \ldots O_{10}^{CQI}]$, and the target length of each uplink control signaling is firstly calculated, and the target lengths are respectively $Q_{ACK}$, $Q_{RI}$ and $Q_{CQI}$, different coding scheme is selected according to $Q_m^1$, and the encoded information is respectively $[q_0^{ACK}, q_1^{ACK}, q_2^{ACK}, \ldots, q_{Q_{ACK}-1}^{ACK}]$, $[q_0^{RI}, q_1^{RI}, q_2^{RI}, \ldots, q_{Q_{RI}-1}^{RI}]$ and $[q_0^{CQI}, q_1^{CQI}, q_2^{CQI}, \ldots, q_{Q_{CQI}-1}^{CQI}]$; the data information $G_1 = N_{symb}^{PUSCH1} \times M_{sc}^{PUSCH1} \times Q_m^1 - Q_{CQI} - Q_{RI}$ on the transport block 1 is calculated, and then the encoded data $[f_0^1, f_1^1, f_2^1, \ldots, f_{G_1-1}^1]$ and $[q_0^{CQI}, q_1^{CQI}, q_2^{CQI}, \ldots, q_{Q_{CQI}-1}^{CQI}]$ are multiplexed to acquire $[g_0^1, g_1^1, g_2^1, \ldots, g_{H^*_1-1}^1]$; then $[q_0^{ACK}, q_1^{ACK}, q_2^{ACK}, \ldots, q_{Q_{ACK}-1}^{ACK}]$, $[q_0^{RI}, q_1^{RI}, q_2^{RI}, \ldots, q_{Q_{RI}-1}^{RI}]$ and $[g_0^1, g_1^1, g_2^1, \ldots, g_{H^*_1-1}^1]$ are interleaved to acquire the information $h_0^1, h_1^1, h_2^1, \ldots, h_{H_1+Q_{RI}-1}^1$ after multiplexing the uplink control signaling and the uplink data information, then the information is transmitted in the transport layer corresponding to the TB1. In this example, the specific way for encoding the uplink control signaling is identical to the existing encoding scheme.

In this example, the network side does not need to care the channel conditions of the two transport blocks, and fixedly transmits the uplink control signaling on the TB1.

The Second Embodiment

Supposing there are two transport blocks TB1 and TB2 on the PUSCH, the base station uses the 1 bit signaling in the downlink control signaling to indicate that the channel quality corresponding to the transport block 2 is relatively good (the base station uses the real-time indication information to notify the user equipment of the transport block with relatively good channel conditions), the UE determines to transmit the uplink control signaling on the TB2, acquires the corresponding modulation scheme $Q_m^2$ according to $I_{MCS}^2$, and the control signaling that need to be transmitted on the current sub-frame are respectively $[O_0^{ACK}, O_1^{ACK}, \ldots O_3^{ACK}]$, $[O_0^{RI}, O_1^{RI}]$, and $[O_0^{CQI}, O_1^{CQI}, \ldots O_{10}^{CQI}]$, and the target length of each uplink control signaling is first calculated, and the target lengths are respectively $Q_{ACK}$, $Q_{RI}$ and $Q_{CQI}$, different encoding scheme are selected according to $Q_m^2$, and the encoded information is respectively $[q_0^{ACK}, q_1^{ACK}, q_2^{ACK}, \ldots, q_{Q_{ACK}-1}^{ACK}]$, $[q_0^{RI}, q_1^{RI}, q_2^{RI}, \ldots, q_{Q_{RI}-1}^{RI}]$ and $[q_0^{CQI}, q_1^{CQI}, q_2^{CQI}, \ldots, q_{Q_{CQI}-1}^{CQI}]$; the data information $G_2 = N_{symb}^{PUSCH2} \times M_{sc}^{PUSCH2} \times Q_m^2 - Q_{CQI} - Q_{RI}$ on the transport block 2 is calculated, and then the encoded data $[f_0^2, f_1^2, f_2^2, \ldots, f_{G_2-1}^2]$ and $[q_0^{CQI}, q_1^{CQI}, q_2^{CQI}, \ldots, q_{Q_{CQI}-1}^{CQI}]$ are multiplexed to acquire $[g_0^2, g_1^2, g_2^2, \ldots, g_{H^*_2-1}^2]$; then $[q_0^{ACK}, q_1^{ACK}, q_2^{ACK}, \ldots, q_{Q_{ACK}-1}^{ACK}]$, $[q_0^{RI}, q_1^{RI}, q_2^{RI}, \ldots, q_{Q_{RI}-1}^{RI}]$ and $[g_0^2, g_1^2, g_2^2, \ldots, g_{H^*_2-1}^2]$ are interleaved to acquire the information $h_0^2, h_1^2, h_2^2, \ldots, h_{H_2+Q_{RI}-1}^2$ after multiplexing the uplink control signaling and the uplink data information, then the information is transmitted on the transport layer corresponding to the TB2. In this example, the specific way for encoding the uplink control signaling is identical to the existing encoding scheme.

The Third Embodiment

Supposing there are two transport blocks TB1 and TB2 on the PUSCH, the indexes corresponding to the two transport blocks are respectively $I_{MCS}^1$ and $I_{MCS}^2$, and $I_{MCS}^1 > I_{MCS}^2$, the UE determines to transmit the uplink control signaling on the TB1, and the corresponding modulation scheme $Q_m^1$ is acquired according to $I_{MCS}^1$, and the control signaling that need to be transmitted on the current sub-frame are respectively $[O_0^{ACK}, O_1^{ACK}, \ldots O_3^{ACK}]$, $[O_0^{RI}, O_1^{RI}]$, and $[O_0^{CQI}, O_1^{CQI}, \ldots O_{10}^{CQI}]$, and firstly the target length of each uplink control signal is calculated, and the target lengths are respectively $Q_{ACK}$, $Q_{RI}$ and $Q_{CQI}$, different encoding schemes are selected according to $Q_m^1$, and the encoded information is respectively $[q_0^{ACK}, q_1^{ACK}, q_2^{ACK}, \ldots, q_{Q_{ACK}-1}^{ACK}]$, $[q_0^{RI}, q_1^{RI}, q_2^{RI}, \ldots, q_{Q_{RI}-1}^{RI}]$ and $[q_0^{CQI}, q_1^{CQI}, q_2^{CQI}, \ldots, q_{Q_{CQI}-1}^{CQI}]$; the data information $G_1 = N_{symb}^{PUSCH1} \times M_{sc}^{PUSCH1} \times Q_m^1 - Q_{CQI} - Q_{RI}$ on the transport block 1 is calculated, and then the encoded data $[f_0^1, f_1^1, f_2^1, \ldots, f_{G_1-1}^1]$ and $[q_0^{CQI}, q_1^{CQI}, q_2^{CQI}, \ldots, q_{Q_{CQI}-1}^{CQI}]$ are multiplexed to acquire $[g_0^1, g_1^1, g_2^1, \ldots, g_{H^*_1-1}^1]$; then $[q_0^{ACK}, q_1^{ACK}, q_2^{ACK}, \ldots, q_{Q_{ACK}-1}^{ACK}]$, $[q_0^{RI}, q_1^{RI}, q_2^{RI}, \ldots, q_{Q_{RI}-1}^{RI}]$ and $[g_0^1, g_1^1, g_2^1, \ldots, g_{H^*_1-1}^1]$ are interleaved to acquire the information $h_0^1, h_1^1, h_2^1, \ldots, h_{H_1+Q_{RI}-1}^1$ after multiplexing the uplink control signaling and the uplink data information, then the information is transmitted on the transport layer corresponding to the TB2. In this example, the specific way for encoding the uplink control signaling is identical to the existing encoding scheme.

The Fourth Embodiment

Supposing there are two transport blocks TB1 and TB2 on the PUSCH, wherein, the TB2 is a retransmitted transport block, supposing $I_{MCS}^1$ of the TB1 is greater than $I_{MCS}^2$ when transmitting the TB2 for the first time, the UE determines to transmit the uplink control signaling on the TB1, and the corresponding modulation scheme $Q_m^1$ is acquired according to $I_{MCS}^1$, and the control signaling that need to be transmitted on the current sub-frame are respectively $[O_0^{ACK}, O_1^{ACK}, \ldots O_3^{ACK}]$, $[O_0^{RI}, O_1^{RI}]$, and $[O_0^{CQI}, O_1^{CQI}, \ldots O_{10}^{CQI}]$, and firstly the target length of each uplink control signaling is calculated, and the target lengths are respectively $Q_{ACK}$, $Q_{RI}$ and $Q_{CQI}$, different encoding schemes are selected according to $Q_m^1$, and the encoded information is respectively $[q_0^{ACK}, q_1^{ACK}, q_2^{ACK}, \ldots, q_{Q_{ACK}-1}^{ACK}]$, $[q_0^{RI}, q_1^{RI}, q_2^{RI}, \ldots, q_{Q_{RI}-1}^{RI}]$ and $[q_0^{CQI}, q_1^{CQI}, q_2^{CQI}, \ldots, q_{Q_{CQI}-1}^{CQI}]$; the data information $G_1 = N_{symb}^{PUSCH1} \times M_{sc}^{PUSCH1} \times Q_m^1 - Q_{CQI} - Q_{RI}$ on the transport block 1 is calculated, and then the encoded data $[f_0^1, f_1^1, f_2^1, \ldots, f_{G_1-1}^1]$ and $[q_0^{CQI}, q_1^{CQI}, q_2^{CQI}, \ldots, q_{Q_{CQI}-1}^{CQI}]$ are multiplexed to acquire $[g_0^1, g_1^1, g_2^1, \ldots, g_{H^*_1-1}^1]$; then $[q_0^{ACK}, q_1^{ACK}, q_2^{ACK}, \ldots, q_{Q_{ACK}-1}^{ACK}]$, $[q_0^{RI}, q_1^{RI}, q_2^{RI}, \ldots, q_{Q_{RI}-1}^{RI}]$ and $[g_0^1, g_1^1, g_2^1, \ldots, g_{H^*_1-1}^1]$ are interleaved to acquire the information $h_0^1, h_1^1, h_2^1, \ldots, h_{H_1+Q_{RI}-1}$ after multiplexing the uplink control signaling and the uplink data information, then the information is transmitted on the transport layer corresponding to the TB1. In this example, the specific way for encoding the uplink control signaling is identical to the existing encoding scheme.

The Fifth Embodiment

Supposing there are two transport blocks TB1 and TB2 on the PUSCH, wherein, the TB2 is a retransmitted transport block, since the $I_{MCS}$ is not transmitted during the retransmission, the $I_{MCS}$ of the data block cannot be determined, but the sizes of two transport block $TBS_1$, $TBS_2$ (where $TBS_2$ is identical to the size when transmitting the transport block 2 for the first time) as well as the resources blocks $N_{PRB}^1$ and $N_{PRB}^2$ occupied by the transport blocks, supposing $TBS_1 > TBS_2$ and $N_{PRB}^1 = N_{PRB}^2$, since $TBS_1/N_{PRB}^1 > TBS_2/N_{PRB}^2$, the uplink control signaling is transmitted on the TB1, the corresponding modulation method $Q_m^1$ is acquired according to $I_{MCS}^1$, and the control signaling that need to be transmitted on the current sub-frame are respectively $[O_0^{ACK}, O_1^{ACK}, \ldots O_3^{ACK}]$, $[O_0^{RI}, O_1^{RI}]$, and $[O_0^{CQI}, O_1^{CQI}, \ldots O_{10}^{CQI}]$, and firstly the target length of each uplink control signaling is calculated, and the target lengths are respectively $Q_{ACK}$, $Q_{RI}$ and $Q_{CQI}$, different encoding schemes are selected according to $Q_m^1$, and the encoded information is respectively $[q_0^{ACK}, q_1^{ACK}, q_2^{ACK}, \ldots, q_{Q_{ACK}-1}^{ACK}]$, $[q_0^{RI}, q_1^{RI}, q_2^{RI}, \ldots, q_{Q_{RI}-1}^{RI}]$ and $[q_0^{CQI}, q_1^{CQI}, q_2^{CQI}, \ldots, q_{Q_{CQI}-1}^{CQI}]$; the data information $G_1 = N_{symb}^{PUSCH1} \times M_{sc}^{PUSCH} \times Q_m^1 - Q_{CQI} - Q_{RI}$ on the transport block 1 is calculated, and then the encoded data $[f_0^1, f_1^1, f_2^1, \ldots, f_{G_1-1}^1]$ and $[q_0^{CQI}, q_1^{CQI}, q_2^{CQI}, \ldots, q_{Q_{CQI}-1}^{CQI}]$ are multiplexed to acquire $[g_0^1, g_1^1, g_2^1, \ldots, g_{H^*_1-1}^1]$; then $[q_0^{ACK}, q_1^{ACK}, q_2^{ACK}, \ldots, q_{Q_{ACK}-1}^{ACK}]$, $[q_0^{RI}, q_1^{RI}, q_2^{RI}, \ldots, q_{Q_{RI}-1}^{RI}]$ and $[g_0^1, g_1^1, g_2^1, \ldots, g_{H^*_1-1}^1]$ are interleaved to acquire the information $h_0^1, h_1^1, h_2^1, \ldots, h_{H_1+Q_{RI}-1}$ after multiplexing the uplink control signaling and the uplink data information, and the information is transmitted on the transport layer corresponding to the TB1. In this example, the specific way for encoding the uplink control signaling is identical to the existing encoding scheme.

The Sixth Embodiment

Supposing there is one transport block on the PUSCH, and the transport block is a retransmitted transport block, then the modulation scheme $Q_m$ is determined according to the $I_{MCS}$ acquired for initial transmission of the transport block, and the uplink control signaling that need to be transmitted on the current sub-frame are respectively $[O_0^{ACK}, O_1^{ACK}, \ldots O_3^{ACK}]$, $[O_0^{RI}, O_1^{RI}]$, and $[O_0^{CQI}, O_1^{CQI}, \ldots O_{10}^{CQI}]$, and firstly the target length of each uplink control signaling is calculated, and the target lengths are respectively $Q_{ACK}$, $Q_{RI}$ and $Q_{CQI}$, different encoding schemes are selected according to $Q_m$, and the encoded information is respectively $[q_0^{ACK}, q_1^{ACK}, q_2^{ACK}, \ldots, q_{Q_{ACK}-1}^{ACK}]$, $[q_0^{RI}, q_1^{RI}, q_2^{RI}, \ldots, q_{Q_{RI}-1}^{RI}]$ and $[q_0^{CQI}, q_1^{CQI}, q_2^{CQI}, \ldots, q_{Q_{CQI}-1}^{CQI}]$; the data information $G = N_{symb}^{PUSCH} \times M_{sc}^{PUSCH} \times Q_m - Q_{CQI} - Q_{RI}$ on the transport block is calculated, and then the encoded data $[f_0, f_1, f_2, \ldots, f_{G-1}]$ and $[q_0^{CQI}, q_1^{CQI}, q_2^{CQI}, \ldots, q_{Q_{CQI}-1}^{CQI}]$ are multiplexed to acquire $[g_0, g_1, g_2, \ldots, g_{H^*-1}]$; then $[q_0^{ACK}, q_1^{ACK}, q_2^{ACK}, \ldots, q_{Q_{ACK}-1}^{ACK}]$, $[q_0^{RI}, q_1^{RI}, q_2^{RI}, \ldots, q_{Q_{RI}-1}^{RI}]$ and $[g_0, g_1, g_2, \ldots, g_{H^*-1}]$ are interleaved to acquire the information $h_0, h_1, h_2, \ldots, h_{H+Q_{RI}-1}$ after multiplexing the uplink control signaling and the uplink data, and the information is transmitted on the transport layer corresponding to the transport block. In this example, the specific way for encoding the uplink control signaling is identical to the existing encoding scheme.

Figure 5:
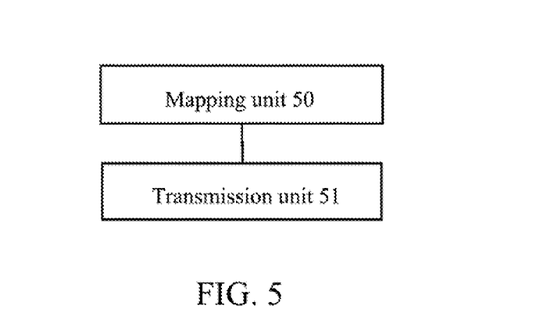
FIG. 5 is a structural diagram of an apparatus for transmitting uplink control signaling on the physical uplink shared channel in the present invention.

FIG. 5 is a structural diagram of the apparatus for transmitting uplink control signaling on the physical uplink shared channel in the present invention, as shown in FIG. 5, the apparatus for transmitting the uplink control signaling on the physical uplink shared channel in the present invention comprises a mapping unit 50 and a transmission unit 51, wherein, the mapping unit 50 is used to map the uplink control signaling to the layer corresponding to one of the transport blocks/codewords when there are two transport blocks on the PUSCH; the transmission unit 51 is used to transmit the uplink control signaling.

Wherein, the apparatus further comprises: a set unit, used to set a transport block/codeword mapping the uplink control signaling to be a fixed-numbered transport block/codeword; or used to set a transport block/codeword mapping the uplink control signaling to be a transport block/codeword indicated by the signaling.

Further, the apparatus also comprises a determination unit; wherein, the determination unit is used to determine modulation and coding scheme indexes of the transport blocks/codewords on the PUSCH according to a selected modulation and coding scheme selected by a base station.

Further, the apparatus also comprises: a set unit used to set a transport block/codeword mapping the uplink control signaling to be a transport block/codeword with a relatively large modulation and coding scheme index.

When the transport block/codeword is a retransmitted transport block/codeword, the index which is used for transmitting the transport block/codeword for the first time is taken as the modulation and coding scheme index of the retransmitted transport block/codeword.

Although the determination unit and the set unit in FIG. 5 are not shown, their functions and the way for information interaction between the aforementioned mapping unit 50 and the transmission unit 51 are clear.

Alternatively, the transport block/codeword carrying the uplink control signaling is such a transport block/codeword that the ratio of a size of the transport block/codeword size to a size of the resource block size occupied by the transport block/codeword is relatively large.

Alternatively, the size of the resource block occupied by the transport block/codeword is the size of a physical resource block occupied by the PUSCH carrying the uplink control signaling.

Those skilled in the field should understand that the apparatus for transmitting uplink control signaling on the physical uplink shared channel shown in FIG. 5 is set for implementing the above method for transmitting uplink control signaling on the physical uplink shared channel, and the function of each processing unit in the system shown in FIG. 5 should be understood by referring to the description in the aforementioned embodiments 1 to 6, and the function of each processing unit can be implemented by the program running on the processor or by the specific logic circuits.

The above description is only the preferred embodiments of the present invention and is not intended to limit the scope of the claims of the present invention.

What is claimed is:

1. A method for transmitting uplink control signaling in a physical uplink shared channel (PUSCH), comprising:

when two transport blocks/codewords are transmitted in a PUSCH, selecting a transport block/codeword with a larger index of modulation and coding scheme indexes of the two transport blocks/codewords in the PUSCH to carry the uplink control signaling, and mapping the uplink control signaling to a layer/layers corresponding to the selected transport block/codeword to transmit;

wherein said modulation and coding scheme indexes of the transport blocks/codewords in the PUSCH are determined by a base station according to a modulation and coding scheme selected by the base station, and notified to a user equipment by the base station.

2. The method of claim 1, further comprising:
when a transport block/codeword is a retransmitted transport block/codeword, taking a modulation and coding scheme index when the transport block/codeword is initially transmitted as a modulation and coding scheme index of the retransmitted transport block/codeword.

3. A method for transmitting uplink control signaling in a physical uplink shared channel (PUSCH), comprising:
when two transport blocks/codewords are transmitted in a PUSCH, selecting a transport block/codeword with a larger ratio of a size of a transport block/codeword to a size of a resource block occupied by the transport block/codeword of the two transport blocks/codewords in the PUSCH to carry the uplink control signaling, and mapping the uplink control signaling to a layer/layers corresponding to the selected transport block/codeword to transmit.

4. The method of claim 3, wherein, the size of the resource block occupied by the transport block/codeword is a size of a physical resource block occupied by the PUSCH carrying the uplink control signaling.

5. An apparatus for transmitting uplink control signaling in a physical uplink shared channel (PUSCH), comprising a mapping unit and a transmission unit; wherein,
the mapping unit is used to, when there are two transport blocks/codewords in a PUSCH, select a transport block/codeword with a larger index of modulation and coding scheme indexes of the two transport blocks/codewords in the PUSCH to carry the uplink control signaling,
or select a transport block/codeword with a lager ratio of a size of a transport block/codeword to a size of a resource block occupied by the transport block/codeword of the two transport blocks/codewords in the PUSCH to carry the uplink control signaling;
and map the uplink control signaling to a layer/layers corresponding to the selected transport block/codeword; and
the transmission unit is used to transmit the uplink control signaling;
wherein said modulation and coding scheme indexes of the transport blocks/codewords in the PUSCH are determined by a base station according to a modulation and coding scheme selected by the base station, and notified to a user equipment by the base station.

6. The apparatus of claim 5, wherein, when a transport block/codeword is a retransmitted transport block/codeword, taking a modulation and coding scheme index when the transport block/codeword is initially transmitted is taken as a modulation and coding scheme index of the retransmitted transport block/codeword.

7. The apparatus of claim 5, wherein, the size of the resource block occupied by the transport block/codeword is a size of a physical resource block occupied by the PUSCH carrying the uplink control signaling.

\* \* \* \* \*